(No Model.)
P. THORPE.
Pneumatic Refuse Conveyer.
No. 241,447. Patented May 10, 1881.
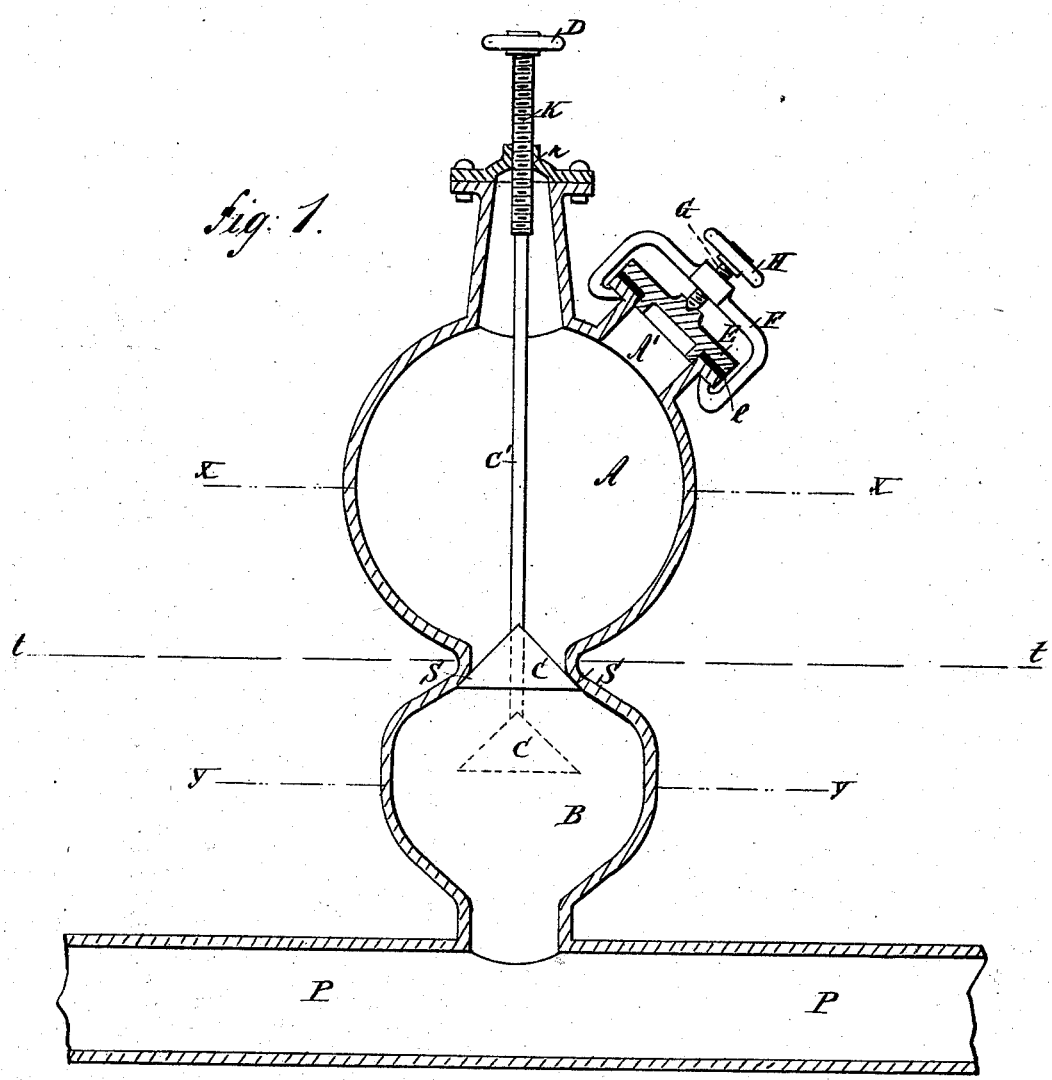
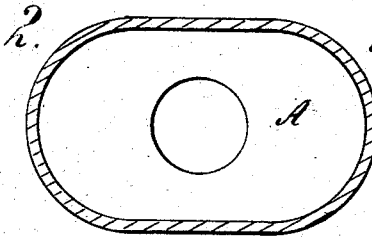
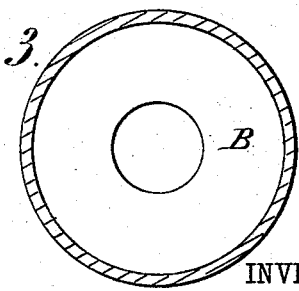
WITNESSES:
A. Schehl.
C. Sedgwick
INVENTOR:
P. Thorpe
BY Munn & Co
ATTORNEYS.
N. PETERS, Photo-Lithographer, Washington, D. C.

UNITED STATES PATENT OFFICE.

PHILIP THORPE, OF NEW YORK, N. Y.

PNEUMATIC REFUSE-CONVEYER.

SPECIFICATION forming part of Letters Patent No. 241,447, dated May 10, 1881.

Application filed March 23, 1881. (No model.)

*To all whom it may concern:*

Be it known that I, PHILIP THORPE, of the city, county, and State of New York, have invented new and useful Improvements in Pneumatic Refuse-Conveyers, of which the following is a specification.

In the accompanying drawings, Figure 1 is a sectional elevation of my apparatus. Fig. 2 is a cross-section on the line $xx$, Fig. 1. Fig. 3 is a cross-section on the line $yy$, Fig. 1.

Similar letters of reference indicate corresponding parts.

The object of my invention is to provide means whereby the refuse of the dwellings and the sweepings of the streets of cities may be deposited into proper receptacles and released therefrom into underground pipes, to be conveyed therein by pneumatic pressure to any desired discharging-point.

My invention consists in connecting with underground conveying-pipes a vessel or series of vessels having upper and lower compartments, the opening between which is controlled by a proper valve, the upper compartment having an opening provided with an air-tight cover, which may be quickly removed, and the lower compartment having direct connection with the conveying-pipes.

I more particularly describe my invention as follows:

My apparatus is intended to be placed at or near the street-curb, and is composed of a double refuse-receptacle having an upper vessel, A, provided with an opening, A', which has a removable cover, E, provided with a suitable packing, $e$, to insure an air-tight joint when said cover is closed by the clamp F, provided with the screw G, operated by the hand-wheel H. The screw K is threaded into the head of the vessel A, as at $k$, and is provided with a hand-wheel, D. The valve-stem C' is rigidly connected with the screw K at its upper end, and is also rigidly secured at its lower end to the conical plug or valve C, which may be tightly closed, as at S in full lines, or opened and lowered into the lower vessel, B, as in dotted lines. This vessel B thus serves as a valve-chamber and a discharging-chute to convey the refuse to the underground pipes P, with which it has open connection, as shown.

The precise form of my apparatus is not a material feature of my invention; but I prefer to make the upper vessel, A, oval, as in Fig. 2, to economize space and increase its capacity, and the lower vessel, B, round in cross-section, as in Fig. 3, to permit the easy discharge of the refuse into the pipes P. I also prefer to make the valve C cylindrical and conical to prevent a lodgment of refuse thereon when it is opened, as in dotted lines, and to also permit its clearing itself and making an air-tight joint at S.

Only so much of the upper vessel, A, may project above the street-level as will permit the removal and replacement of the cover E, or the whole of said vessel may so project, as indicated by the dotted line $tt$, if desired.

The operation of my apparatus is as follows: The valve C being closed the cover E may be removed, when desired, to permit the reception of refuse into the upper vessel, A, which may be filled. To discharge said vessel A the cover E is firmly closed and the valve C opened and the refuse falls into the vessel B and pipe P, from whence it is drawn by exhausting-engines stationed at convenient points, and discharged where desired. After the vessel A is thus emptied the valve C is again closed and the vessel A may be again filled, to be emptied in like manner.

By the use of my double refuse-vessels provided with valves C and connected by pipes P the refuse from any one or more of said vessels may be at any time removed without admitting air to the said pipes P, to prevent the proper action of the exhausting-engines.

Having thus described my invention, I claim as new and desire to secure by Letters Patent—

In combination with the pneumatic conveying-pipes P, the double-chambered vessel A B, provided with valve C and cover E, and means for opening and closing said valve and cover, substantially as and for the purposes set forth.

PHILIP THORPE.

Witnesses:
J. H. SCARBOROUGH,
C. SEDGWICK.